UNITED STATES PATENT OFFICE.

FRANCIS G. MURRAY, OF WASHINGTON, DISTRICT OF COLUMBIA.

IMPROVEMENT IN THE MANUFACTURE OF GUNPOWDER.

Specification forming part of Letters Patent No. 48,303, dated June 20, 1865.

*To all whom it may concern:*

Be it known that I, FRANCIS G. MURRAY, of Washington, District of Columbia, have invented or discovered a new and useful Compound for Explosive Powder; and I do hereby declare that the following is a full, clear, and exact description of the manufacture of the same.

To enable those skilled in the art to manufacture this powder, I will proceed to give the ingredients composing it and the mode of manufacturing it.

I take forty-five (45) parts or pounds of (chlorate of) potassa and dissolve it in twenty gallons of boiling water. Then add fifteen (15) parts or pounds of saltpeter, and stir it while boiling until all is dissolved. Then add thirty (30) parts or pounds of finely ground or pulverized bark. Let it boil from fifteen to twenty minutes. Then add eight (8) parts or pounds of charcoal finely pulverized, and to this add two (2) pounds or parts of pure lamp-black, and stir the mass until the water is all boiled out and it becomes a dry powder. The material is now ready for use.

If it is desired, this powder can be granulated in the same manner that ordinary gunpowder is; but it is not necessary that it should be for small-arms. This powder leaves no residuum in a gun after firing, and is well adapted to sporting purposes.

Having thus fully described my invention, what I claim as new, and desire to secure by Letters Patent, is—

The employment of the within-described material compounded as and for the purpose specified.

FRANCIS G. MURRAY.

Witnesses:
PETER LAMMOND,
C. M. ALEXANDER.